United States Patent [19]

Bischoff et al.

[11] Patent Number: 5,883,215
[45] Date of Patent: Mar. 16, 1999

[54] POLYMERISATION OF CYCLOSILOXANES

[75] Inventors: Remy Bischoff, Brussels, Belgium; John S. Currie, Penarth, United Kingdom; William Herron, Cowbridge, United Kingdom; Richard Taylor, Barry, United Kingdom

[73] Assignee: Dow Corning, Ltd, Barry

[21] Appl. No.: 26,582

[22] Filed: Feb. 20, 1998

[30] Foreign Application Priority Data

Mar. 20, 1997 [GB] United Kingdom ................ 9703554.7

[51] Int. Cl.[6] .................................................. C08G 77/04
[52] U.S. Cl. .............................................. 528/21; 528/23
[58] Field of Search ........................................ 528/21, 23

[56] References Cited

U.S. PATENT DOCUMENTS

| 5,380,902 | 1/1995 | Hager et al. | 528/21 X |
|---|---|---|---|
| 5,382,644 | 1/1995 | Montaque et al. | 528/23 X |
| 5,403,909 | 4/1995 | Rubinsztajn | 528/23 X |
| 5,510,441 | 4/1996 | Razzano | 528/21 X |
| 5,698,654 | 12/1997 | Nye et al. | 528/21 |

OTHER PUBLICATIONS

Schwesinger et al., Liebigs Ann. 18996, 1055–1081; 1996.
Molenberg and Moller, Maromol Rapid Commun. 16, 449–453 (1995).
Van Dyke and Clarson in Poly Prep ACS Div. Polym Chem 1996, 37,668.

*Primary Examiner*—Paul F. Shaver
*Attorney, Agent, or Firm*—Jennifer S. Warren

[57] ABSTRACT

A process for the ring-opening polymerisation of cyclosiloxanes, which comprises contacting a cyclosiloxane with 1–500 ppm by weight of a phosphazene base, based on the weight of cyclosiloxane, in the presence of water, preferably 0.5–10 mols per mol of phospazene base. Also claimed is a process in which the cyclosiloxane is present together with an agent which inhibits catalyst activity of the phosphazene base, e.g. carbon dioxide or water, in which the polymerisation is initiated by reducing the effect of the inhibiting agent e.g. by heating.

11 Claims, 1 Drawing Sheet

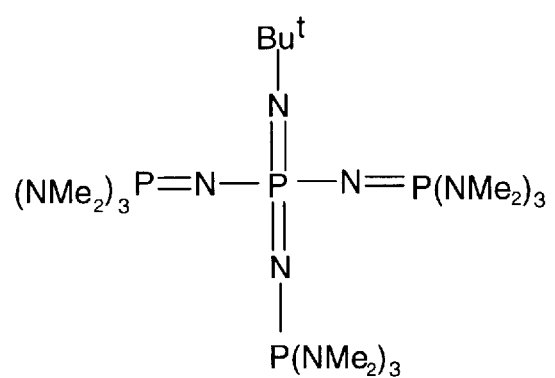

POLYMERISATION OF CYCLOSILOXANES

This invention relates to the ring-opening polymerisation of cyclosiloxanes catalysed by phosphazene bases.

Cyclosiloxanes are critical intermediates in the silicone industry, primarily as starting monomers for polymerisation. Several general routes are known for the preparation of cyclosiloxanes. Together with hydroxy-end blocked linear polydiorganosiloxanes, they are formed as a product of hydrolysis of the corresponding diorganodihalosilanes. Mixtures of cyclic and/or linear polydiorganosiloxanes can also be equilibrated or "cracked" by reaction in the presence of a catalyst such as a base to form an equilibrium mixture of more desired cyclics and linears.

Various catalysts are known for the polymerisation of cyclosiloxanes. Examples are alkali metal hydroxides, alkali metal alkoxides or complexes of alkali metal hydroxides and an alcohol, alkali metal silanolates, and phosphonitrile halides (sometimes referred to as acidic phosphazenes). Such polymerisations can be carried out in bulk, in solvents (such as non-polar or polar organic solvents) or in emulsion. An endblocking agent may be used to regulate the molecular weight of the polymer and/or to add functionality. Polymerisation may be terminated by using a neutralising agent which reacts with the catalyst to render it non-active. In most cases catalyst residues remain in the polymer product and are desirably removed, such as by filtration.

Phosphazene bases are known to be extremely strong bases. Numerous phosphazene bases and routes for their synthesis have been described in the literature, for example in Schwesinger et al, Liebigs Ann. 1996, 1055–1081.

The use of a phosphazene base catalyst for the ring-opening polymerisation of a cyclosiloxane on a laboratory scale has been described in Molenberg and Möller, Macromol Rapid Commun. 16, 449–453(1995). Octamethylcyclotetrasiloxane(D4, where D denotes an —Si(CH$_3$)$_2$O—unit) was polymerised in toluene solution in the presence of methanol and the phosphazene base I (FIG. 1), used as a 1 molar solution in hexane. All the components were carefully dried before the reaction, which was carried out under an argon atmosphere containing less than 1 ppm O$_2$ and H$_2$O. The methanol was deprotonated by the phosphazene base to form methoxide ions which initiate the reaction. The phosphazene base catalyst was used in an amount of at least 871 ppm based on the weight of D4. A similar reaction system has been used by Van Dyke and Clarson in Poly Prep ACS Div Polym Chem 1996, 37, 668. In this case, tetraphenyltetramethyl-cyclotetrasiloxane, the phenylmethyl analogue of D4, was polymerised. The catalyst system was the same as in Molenberg and Möller, but was used at concentrations which were higher based on the weight of D4, and again all the reaction components were carefully dried beforehand.

We have found that addition of this hexane/methanol activated catalyst gives erratic polymerisation behaviour. We have therefore sought a catalyst medium that gives reproducible polymerisation, preferably without the need for solvent. We have surprisingly found that it is possible to carry out the ring-opening polymerisation of cyclosiloxanes with a phosphazene base catalyst in the presence of water. In the simplest case, sufficient water can be provided simply by taking no special steps to dry the cyclosiloxane starting material. To ensure the presence of water it is sufficient to avoid totally anhydrous conditions. Very small amounts of water, e.g. a few molecules, have been found to suffice to allow the polymerisation to take place. Furthermore, we have found that it is not essential to form a methoxide ion, e.g. by using methanol, in contrast to the prior art teaching. Surprisingly, even lower levels of phosphazene base catalyst can be used where water is present, than were used in the prior art, whilst maintaining or improving the polymerisation efficiency.

The present invention thus provides a process for the ring-opening polymerisation of cyclosiloxanes, which comprises contacting a cyclosiloxane with 1–500 ppm by weight of a phosphazene base, based on the weight of cyclosiloxane, in the presence of water.

The phosphazene base reacts with trace quantities of water present to form highly active hydroxide ions which initiate the polymerisation. The phosphazene base will also react with certain other chemical groups which may be present, e.g. silanol or alcohol, to form similarly active polymerisation-initiating species. The phosphazene base may be in ionic form, with a strong anion such as fluoride or hydroxide, which is active in initiating polymerisation.

As the phosphazene base is a very powerful catalyst for the polymerisation, it can be present in a relatively low proportion, for example from 2–200 ppm by weight, based on the weight of cyclosiloxane. The proportion of catalyst actually used will be selected depending on the polymerisation product that is sought.

The proportion of water present in the reaction is preferably at least 0.5, more preferably from 0.5–10 mols per mol of phosphazene base, most preferably from 1 mol–10 mols per mol of phosphazene base. It is possible to employ higher proportions of water, and this can have the benefit of enabling greater control over the polymerisation reaction, as described in more detail below.

In principle, any phosphazene base is suitable for use in the present invention. Phosphazene bases have the following core structure P=N—P=N, in which free N valences are linked to hydrogen, hydrocarbon, —P=N or =P—N, and free P valences are linked to —N or =N. A wide range of suitable phosphazene bases has been described in Schwesinger et al (see above). Some phosphazene bases are commercially available from Fluka Chemie AG, Switzerland. The phosphazene bases preferably have at least 3 P—atoms. Some preferred phosphazene bases are of the following general formulae:

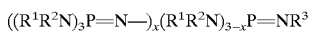

or

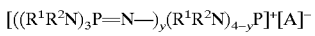

which R$^1$ and R$^2$ are each independently selected from the group consisting of hydrogen and an optionally substituted hydrocarbon group, preferably a C$^1$–C$_4$ alkyl group, or in which R$^1$ and R$^2$ together form heterocyclic ring, preferably a 5- or 6-membered ring; R$^3$ is hydrogen or an optionally substituted hydrocarbon group, preferably a C$_1$–C$_{20}$ alkyl group, more preferably a C$_1$–C$_{10}$ alkyl group; x is 1, 2 or 3, preferably 2 or 3; y is 1, 2, 3 or 4, preferably 2, 3 or 4; and A is an anion, preferably fluoride, hydroxide, silanolate, alkoxide, carbonate or bicarbonate.

In particularly preferred compounds, R$^1$ and R$^2$ are methyl, R$^3$ is tert. butyl or tert. octyl, x is 3, y is 4 and A is fluoride or hydroxide. A preferred compound is the phosphazene base I shown in FIG. 1.

The polymerisation can be carried out in bulk or in the presence of a solvent. Suitable solvents are liquid hydrocarbons or silicone fluids. The phosphazene base catalyst can be diluted in a hydrocarbon solvent, such as hexane or heptane, or dispersed in a silicone fluid such as polydiorganosiloxanes. Where the phosphazene base catalyst is initially in a solvent such as hexane, the hexane can be removed by evaporation under vacuum, and the catalyst dispersed in a silicone fluid to give a stable clear solution. When this silicone dissolved catalyst is used for polymerisation reactions, the catalyst disperses evenly and gives reproducible results. The catalyst can also be dissolved in water, and this has the advantage of moderating and enabling greater control over the polymerisation reaction, as described below.

The polymerisation reaction can be carried out at ambient temperature or under heating. Heating, for example to 100° C. or higher, is appropriate when the catalyst activity has been moderated as described below. The time taken for polymerisation will depend on the activity of the catalyst in the chosen system, and on the desired polymer product. In the absence of moderation, the phosphazene base catalysts are sufficiently active to convert cyclosiloxanes such as D4 to high molecular weight polysiloxane gums within a few seconds.

The starting material is a cyclosiloxane (also known as a cyclic siloxane). Cyclic siloxanes which are useful are well known and commercially available materials. They have the general formula $(R_2SiO)_n$, wherein R denotes hydrogen or an optionally substituted alkyl, alkenyl, aryl, alkaryl or aralkyl group having up to 8 carbon atoms, n denotes an integer with a value of from 3 to 12. R can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl, vinyl, and trifluoropropyl. Preferably at least 80% of all R groups are methyl or phenyl groups, most preferably methyl. It is most preferred that substantially all R groups are methyl groups. Preferably the value of n is from 3 to 6, most preferably 4 or 5. Examples of suitable cyclic siloxanes are octamethyl cyclotetrasiloxane, decamethyl pentacyclosiloxane, cyclopenta (methylvinyl) siloxane, cyclotetra(phenylmethyl) siloxane and cyclopenta methylhydrosiloxane. One particularly suitable commercially available material is a mixture of octamethylcyclotetrasiloxane and decamethylcyclopentasiloxane.

Where R is methyl, the compound is referred to as Dn; for example, where n=4 the compound is called D4.

The reaction mixture is generally purged with inert gas, preferably nitrogen, prior to addition of the catalyst so as to remove any dissolved $CO_2$. Because of the extremely rapid reaction, the reaction mixture is vigorously mixed to ensure homogenous dispersion of the catalyst. Inadequate mixing can result in the catalyst being encapsulated in beads of gum as it is added to the reaction, and the catalyst then takes some time to diffuse out of the gum particles, giving a slower reaction.

The process according to the invention can be used to make gums of high molecular weight, for example from $1\times10^6$ to $100\times10^6$. The molecular weight of silicone polymers is limited by the concentration of end groups and in the absence of added end groups is determined by the catalyst concentration. The catalyst used in the present invention has sufficient activity to use the reaction to result in polymers in a reasonable time at a low catalyst concentration. Uses of these high molecular weight polymers include high consistency rubber, drag-reducing additives for oil pipelines and personal care products. We have found that phosphazene base catalysts when used at very low concentrations (2–500 ppm) based on the weight of the cyclosiloxanes produce polymers with very high molecular weights (1,000,000–100,000,000) very quickly (10s –8 h) at moderate to low temperatures (20°–100° C.). Molecular weight changes during polymerisation can be monitored by sampling the reaction during polymerisation, and analysing each sample by GPC (gel permeation chromatography) to determine the molecular weight. Polymers of very high molecular weights can be obtained almost immediately. The process can be used to produce ultra high molecular weight materials. This is by virtue of the very low catalyst concentrations needed for the polymerisation, with the result that the molecular weight of the polymer produced is dependent on the end group concentration which is equal to the catalyst concentration. However, we have found that at very low catalyst concentrations, such as 2 ppm, the molecular weight obtained increases with reaction time. The process may be limited by diffusion of the catalyst, which is very slow in these high molecular weight polymers.

As an alternative to high molecular weight gums, the process according to the invention can also be used in equilibration reactions to produce silicone fluids, for example in the viscosity range at 25° C. of from 1 to 150,000 $mm^2/s$. An endblocker is added in a proportion calculated to produce the desired molecular weight of polymer. Suitable endblockers are, for example, polysiloxanes in the molecular weight range from 160 upwards, in particular polydimethylsiloxane of the general formula $MD_xM$ where M is trimethylsilyl, D is —$Si(CH_3)_2O$— and x has a value of from 0 to 20. The endblocker may have one or more functional groups such as hydroxy, vinyl or hydrogen. Water also acts as a endblocker, with the introduction of hydroxy functional groups.

When the desired polymer has been formed, it is usually desirable to neutralise the catalyst to stabilise the product and prevent any further reaction. Suitable neutralising agents are acids such as acetic acid, silyl phosphate, polyacrylic acid chlorine substituted silanes, silyl phosphonate or carbon dioxide.

We have found during preparation of the phosphazene base catalysts that air reacts very rapidly with the catalyst solutions giving a hazy material which eventually leads to an insoluble liquid phase. This is believed to be due to the reaction of the catalyst with water and/or $CO_2$ to form an insoluble hydroxide or carbonate salt. We have also found that this deactivation of the catalyst can be reversed e.g. by heating, purging with inert gas or subjecting the mixture to reduced pressure. This makes it possible to moderate or control the polymerisation reaction. This is particularly advantageous in view of the very rapid reaction which occurs when the catalyst is not moderated. Because of the very low levels of catalyst employed in these reactions (which can be as low as 1–10 ppm), the reaction with water and $CO_2$ needs to be taken into account to control the reaction and obtain reproducible results. By dissolving the phosphazene base in water, in which it is very soluble and very stable, the catalyst activity becomes much more controllable and the polymers produced are of lower molecular weight. This is caused by the water acting as a catalyst inhibitor and also as an endblocker. The inhibiting effect of the water can be reduced by reducing the amount of water present e.g. by heating. At temperatures below 100° C. the rate of polymerisation is relatively slow in the presence of water and/or $CO_2$, for example taking up to more than 24 hours to reach gum viscosity. At temperatures above 100° C. (e.g. 100°–150° C.), polymerisation becomes much faster, for example taking up to 5–60 minutes to reach gum viscosity. Such control of the reaction can also be achieved if the water is mixed with or replaced by alcohol (e.g. $C_1$–$C_6$ alcohols such as methanol or ethanol).

We have also found that polymerisation can be prevented by exposing a mixture of cyclosiloxane and phosphazene base catalyst to air and/or $CO_2$. The polymerisation can then be initiated ("command polymerisation") simply by removing the air and/or $CO_2$ e.g. by heating the mixture (e.g. to 100° C. –140° C. for a few minutes). A D4 catalyst mixture (2–50 ppm of catalyst) is stable in air at 20° C. for extended periods (up to 7 days).

Prior methods for the synthesis of siloxane polymers by ring-opening equilibration polymerisation produced products which may typically consist of small cyclics (5–10% D4–D10), macrocyclics (5–10% D11–D50) and polymer (80–90%). The present invention makes it possible to produce polymers by ring-opening polymerisation which have low levels of macrocyclics. By the use of the phosphazene base catalysts in the ring opening polymerisation of e.g. D4 according to the present invention, it is possible to produce polymers that contain less than 1% by weight total of macrocyclics.

Thermogravimetric analysis (TGA) of the polymers produced according to the invention shows that they have enhanced thermal stability. High molecular weight gums have been produced with decomposition onset temperatures of more than 450° C., and silicone fluids have been produced with decomposition onset temperatures of more than 500° C. The enhanced thermal stability is attributed to the very low levels of catalyst residues remaining in the product. The low catalyst residues also mean that a filtration step is usually not necessary, which is a very significant process advantage.

The following Examples illustrate the invention. Unless stated otherwise, all parts and percentages are by weight, and the phosphazene base used is that of formula I shown in FIG. 1 (commercially available from Fluka, catalogue number 79421).

EXAMPLE 1
Preparation of Phosphazene Base Solution in Siloxane Fluid

A mixture of 1.33 g of hexamethyldisiloxane and 48.67 g of octamethylcyclotetrasiloxane was degassed in a schlenk flask by bubbling nitrogen gas through the solution for a period of 2 hours. To the solution was then added 1 ml of a 1.0M solution in hexane of phosphazene base I. The solution viscosity immediately began to rise with stirring. After equilibration at room temperature for 24 hours, the mixture was ready for use as the catalyst solution for the subsequent polymerisation of dimethyl cyclosiloxanes.

EXAMPLE 2
Preparation of Phosphazene Base Solution in Heptane

The catalyst solution in heptane (less volatile than n-hexane) was prepared as follows: in a Schlenck tube under nitrogen 49 $cm^3$ of heptane and 1 ml of phosphazene base in solution in n-hexane 1 mol/l were mixed. The concentration of the final catalyst was 0.02 mol/l.

EXAMPLE 3
High molecular weight silicone gums

D4 cyclics (1 kg) was placed in a reaction vessel under nitrogen, stirred and heated to 100° C. Nitrogen was bubbled through the reaction mixture for 30 minutes to remove any $CO_2$ dissolved in the cyclics. The catalyst was added as a heptane solution. Polymerisation occurred within 1 minute and was monitored by torque measurements. When the stirrer could no longer agitate the mixture it was turned off but heating was continued at 100° C. for the required time between 30 minutes and 8 h, followed by cooling the mixture to 25° C. There is a correlation between heating and final molecular weight (as shown in the Table 1).

TABLE 1

| Sample | Catalyst Conc. | Temp °C. | Time of reaction/ minutes | Mn Number average Mw | Mw Weight average Mw | Mz Mw/Mn | Peak Mw |
|---|---|---|---|---|---|---|---|
| 1 | 25 ppm | 100 | 30 | $2.79 \times 10^5$ | $1.28 \times 10^6$ | 4.6 | $9.67 \times 10^5$ |
| 2 | 2 ppm | 100 | 60 | $7.85 \times 10^5$ | $3.08 \times 10^6$ | 3.9 | $1.27 \times 10^6$ |
| 3 | 2 ppm | 100 | 180 | $6.9 \times 10^7$ | $9.3 \times 10^7$ | 1.3 | $3.87 \times 10^7$ |

Table 1 shows the results for different catalyst concentrations and times of reaction. In Sample 1, polymerisation occurred within 30 seconds of adding the catalyst and the stirrer was turned off after 1 minute. In each case, the product was removed from the reaction vessel and stored in glass jars. The product was analysed by gpc (gel permeation chromatography and TGA (thermogravimetricanalysis)). Further results are shown in Table 2.

TABLE 2

| Sample | TGA Decomposition Onset Temperature C. | Volatile content (TGA) % |
|---|---|---|
| 1 | 509 | 12 |
| 2 | 482 | 13 |
| 3 | 499 | 13 |

The results show higher molecular weights and enhanced temperature stability for these gums. Normal decomposition onset temperatures for gums are below 400° C.

EXAMPLE 4

The procedure is as in Example 3 except that the phosphazene base catalyst is used in a concentration of 5 ppm and the reaction temperature is 50° C. The results are shown in Table 3.

TABLE 3

| Reaction Time | Polymer % (TGA) | Mn | Mw | Mw/Mn | Peak Mw | TGA decomp. onset °C. |
|---|---|---|---|---|---|---|
| A 60 sec. | 3.4 | No polymer observed | — | — | — | 466 |
| B 90 sec. | 8.1 | $1.2 \times 10^6$ | $1.8 \times 10^6$ | 1.5 | $1.8 \times 10^6$ | 447 |
| C 120 sec. | 11.3 | $9.6 \times 10^5$ | $1.8 \times 10^6$ | 1.9 | $1.9 \times 10^6$ | 466 |
| D 15 min. | 74.4 | $1.6 \times 10^6$ | $2.4 \times 10^6$ | 1.5 | $2.7 \times 10^6$ | 482 |

EXAMPLE 5

The procedure is as described in Example 3, except that the phosphazene base catalyst is dissolved in water and used in a concentration of 4 ppm. The results are shown in Table 4.

TABLE 4

| Reaction Time min. | Viscosity mPa·s | Mn Number average Mw | Mw Weight average Mw | Mw/Mn | Peak Mw | Conversion % by GPC |
|---|---|---|---|---|---|---|
| 10 | 574 | $5.5 \times 10^4$ | $1.2 \times 10^5$ | 2.2 | $1.1 \times 10^5$ | 28 |
| 20 | 2859 | $7.5 \times 10^4$ | $1.5 \times 10^5$ | 2.0 | $1.24 \times 10^5$ | 35 |
| 30 | 13470 | $6.5 \times 10^4$ | $1.8 \times 10^5$ | 2.8 | $1.5 \times 10^5$ | 46 |

TABLE 4-continued

| Reaction Time min. | Viscosity mPa·s | Mn Number average Mw | Mw Weight average Mw | Mw/Mn | Peak Mw | Conversion % by GPC |
|---|---|---|---|---|---|---|
| 60 | Gum | $1.5 \times 10^5$ | $4.1 \times 10^5$ | 2.7 | $2.8 \times 10^5$ | 85 |

EXAMPLE 6

Polmerisation D4 was undertaken in bulk under nitrogen in a thermostat glass reactor, fitted with a mechanical stirrer. The catalyst solution in heptane, prepared as in Example 2, was weighed in a syringe and injected into the reaction mixture. The stop watch was activated as soon as the phosphazene base was added to the cyclics. Samples were withdrawn regularly and quenched with a solution of acetic acid in toluene (5 fold excess compared to the initiator concentration). These samples were analysed by capillary gas chromatography (GC) and size exclusion chromatography (SEC). These combined analytical techniques allowed us to determine the relative mass percentages of all products (small cyclics, linear and cyclics ogligomers, and polymer) over time. Table 5 below shows the results with a catalyst concentration of $5 \times 10^{-3}$ mol/l and a temperature of 20° C.

TABLE 5

| Time | $D_4$ | $D_5$ | $D_6$ | $D_7$ | $D_8$ | $D_9$ | $D_{10}$ | $D_{11}$ | $D_{12}$ | other oligo. M < 1100 | Polymer M > 1100 | Mpeak |
|---|---|---|---|---|---|---|---|---|---|---|---|---|
| zero | 98.9 | 1.1 | 0 | 0 | 0 | 0 | 0 | 0 | 0 | 0 | 0 | 0 |
| 19 s | 90.3 | 1.2 | 0.2 | 0.2 | 0.1 | 0 | 0 | 0 | 0 | 0 | 8.0 | 125000 |
| 46 s | 87.2 | 1.3 | 0.5 | 0.2 | 0.7 | 0 | 0 | 0 | 0 | 0.5 | 9.6 | 168000 |
| 1 min 15 s | 10.9 | 1.5 | 0.7 | 0.4 | 0.5 | 0.5 | 0.2 | 0 | 0 | 1.4 | 83.9 | 225000 |
| 1 min 49 s | 9.3 | 2.1 | 1.6 | 0.6 | 0 | 0 | 0 | 0 | 0 | 1.6 | 84.8 | 278000 |
| 3 min 2 s | 7.8 | 2.3 | 2.0 | 0.3 | 0.2 | 0 | 0 | 0 | 0 | 1.8 | 85.6 | 267000 |
| 11 min 30 s | 5.2 | 2.9 | 0.8 | 0.3 | 0.5 | 0.1 | 0.2 | 0.1 | 0 | 2.5 | 87.4 | 260000 |

EXAMPLE 7

The procedure is as described in Example 6 except that the catalyst concentration is $10^{-4}$ mol/l and the temperature is 83° C. The results are shown in Table 6.

EXAMPLE 8

The procedure is as described in Example 6 except that the catalyst concentration is $2.5 \times 10^{-3}$ mol/l and the temperature is 19° C. The results are shown in Table 7 below.

TABLE 6

| Time | $D_4$ | $D_5$ | $D_6$ | $D_7$ | $D_8$ | $D_9$ | $D_{10}$ | $D_{11}$ | $D_{12}$ | other oligo. M < 1100 | Polymer M > 1100 | Mpeak |
|---|---|---|---|---|---|---|---|---|---|---|---|---|
| zero | 98.9 | 1.1 | 0 | 0 | 0 | 0 | 0 | 0 | 0 | 0 | 0 | 0 |
| 18 s | 78.2 | 1.0 | 0.3 | 0.4 | 0.1 | 0 | 0 | 0 | 0 | 2.8 | 17.2 | 198700 |
| 27 s | 73.5 | 1.4 | 0.2 | 0 | 0 | 0 | 0 | 0 | 0 | 3.1 | 21.8 | 334100 |
| 50 s | 64.2 | 2.2 | 0.1 | 0.3 | 0.8 | 0 | 0 | 0 | 0 | 3.9 | 28.5 | 429000 |
| 2 min 10 s | 50.2 | 3.4 | 0.5 | 0.2 | 0.2 | 0 | 0 | 0 | 0 | 4.4 | 41.1 | 828400 |
| 3 min 30 s | 32.4 | 4.4 | 0.6 | 0.5 | 0.2 | 0.9 | 0 | 0 | 0 | 7.9 | 53.1 | 640300 |

TABLE 7

| Time | $D_4$ | $D_5$ | $D_6$ | $D_7$ | $D_8$ | $D_9$ | $D_{10}$ | $D_{11}$ | $D_{12}$ | other oligo. M < 1100 | Polymer M > 1100 | Mpeak |
|---|---|---|---|---|---|---|---|---|---|---|---|---|
| zero | 98.9 | 1.1 | 0 | 0 | 0 | 0 | 0 | 0 | 0 | 0 | 0 | 0 |
| 18 s | 95.2 | 1.1 | 0.1 | 0.2 | 0.2 | 0 | 0 | 0 | 0 | 0 | 3.2 | 74000 |
| 1 min 3 s | 94.3 | 1.1 | 0.1 | 0.2 | 0.3 | 0 | 0 | 0 | 0 | 0 | 4.0 | 121000 |
| 1 min 48 s | 67.7 | 1.7 | 0.6 | 0.3 | 0.3 | 0 | 0 | 0 | 0 | 0.9 | 28.5 | 335000 |
| 2 min 18 s | 12.1 | 3.4 | 1.3 | 0.4 | 0.4 | 0 | 0 | 0 | 0 | 0.9 | 81.5 | 229000 |
| 4 min 48 s | 9.6 | 4.6 | 1.6 | 0.6 | 0 | 0 | 0 | 0 | 0 | 0.9 | 83.9 | 290000 |
| 8 min 4 s | 7.5 | 3.9 | 1.4 | 0.8 | 0.2 | 0 | 0 | 0 | 0 | 0.9 | 85.3 | 360000 |

EXAMPLE 9

Following the procedure in Example 6, the effect of the concentration of initiator on the molecular weight of the polymer was investigated. We found that the lower the initial concentration of initiator, the longer the polymer chains for a given conversion of D4. The results for different initial concentrations of initiator are shown in Table 8 below.

TABLE 8

| [catalyst] mol/l | calculated Mn | Mpeak obtained | % Polymer |
|---|---|---|---|
| $5.0 \times 10^{-3}$ | 170,000 | 260,000 | 87.4 |
| $2.5 \times 10^{-3}$ | 323,000 | 360,000 | 85.3 |
| $1.0 \times 10^{-4}$ | 2,461,000 | 2,360,000 | 27.8 |
| $7.5 \times 10^{-6}$ | 30,000,000 | 1,540,000 | 24.0 |

The calculated Mn values were similar to experimental Mpeak except for very low concentrations of initiator. Thus, in the absence of endblocker, the concentration of initiator controlled the molecular weight of the polymer. At very low concentrations of initiator, the theoretical Mn can be very high (greater than $10 \times 10^6$). However, this was not observed in practice probably because the products became too viscous for the polymer to attain its theoretical molecular weight. It will be possible to obtain higher molecular weights by reaction in solution.

EXAMPLE 10

Following the procedure of Example 6, the endblocker $MD_xM$ (DC 200 fluid, 10 cS) was used during polymerisation of D4 to control the molecular weight of the polymer. For each target molecular weight (Mpeak expected), 1 mol of endblocker mol of polymer was used. One can calculate a theoretical molecular weight (Mpeak calculated) at partial conversion of D4 as follows:

Mpeak Calculated=Mpeak Expected×% Polymer

The results in Table 9 below show that the molecular weights determined by SEC are in accordance with theoretical Mpeak.

TABLE 9

| [catalyst] mol/l | T (°C.) | Mpeak expected (at 100% D4) conversion | Mpeak calculated | Mpeak SEC | % Polymer |
|---|---|---|---|---|---|
| $10^{-4}$ | 41 | 400,000 | 150,000 | 217,400 | 37.6 |
| $10^{-6}$ | 25–65 | 100,000 | 75,000 | 67,000 | 75.1 |
| $10^{-5}$ | 45 | 200,000 | 33,000 | 40,000 | 16.7 |
| $10^{-6}$ | 55 | 200,000 | 160,000 | 212,300 | 78.6 |

EXAMPLE 11

In a similar way to that in Example 10, the effect of water acting as an endblocker leading to SiOH functional polymers of various sizes was investigated. Reactions were carried out with various concentrations of water premixed with the commercial solution of phosphazene base (1 mol/l in hexane). Table 10 below shows a good match between theoretical calculated Mpeak and experimental Mpeak determined by SEC.

TABLE 10

| [catalyst] (ppm) | T (°C.) | [H₂O]o mol/l | % Polymer | Mpeak calculated | Mpeak SEC |
|---|---|---|---|---|---|
| 5 | 101 | 4.00 × 10⁻³ | 43.3 | 100,000 | 90,000 |
| 5 | 102 | 4.00 × 10⁻³ | 42.7 | 100,000 | 117,000 |
| 5 | 83 | 4.35 × 10⁻⁴ | 20.5 | 446,000 | 450,000 |
| 10 | 84 | 8.70 × 10⁻⁴ | 23.5 | 256,000 | 292,000 |

It is thus possible to synthesise silanol-ended polymer with controlled molecular weight. Thus, the process of the invention can be used to prepare short chain oligosiloxane diols. Water also has the advantage of slowing the polymerisation down to allow much more control over the polymerisation.

EXAMPLE 12

Following the procedure in Example 6, various neutralising agents were tested to neutralise the phosphazene base catalyst. Reactions were undertaken at 100° C. under nitrogen. The initial concentration of catalyst was 15 ppm in each experiment. Vinyl endblockers (a short chain polydimethyl siloxane having vinyldimethyl silyl endgroups and having a degree of polymerisation of from 5 to 10 on average) were used in order to avoid high viscosity products and permit a faster neutralisation. After 30 minutes of reaction, the neutralising agent was added to the flask. Vacuum (15 mBar) was applied 15 minutes after neutralisation, and the reaction was either maintained at 100° C. or heated at 150° C. In order to collect any volatiles (cyclics), the flask was equipped with a condenser and a cooling trap. Heating and vacuum were maintained until no more volatiles were collected. The results are given in Table 11 below.

TABLE 11

| Compound used to quench catalyst | Stripping temperature (°C.) | Mass cyclics collected (g) |
|---|---|---|
| CO₂ | 100 | 1.78 |
| Acetic acid | 100 | 0.90 |
| Silyl phosphate | 150 | 5.95 |
| Polyacrylic acid | 150 | 15.00 |
| CO₂ | 150 | 65.50 |

The compounds obtained after quenching the reaction mixture with CO₂ or acetic acid were stable at 100° C. under reduced pressure. However, with CO₂ as neutralising agent at 150° C. under reduced pressure, depolymerisation occurred indicating the neutralisation was reversible. With silyl phosphate or acetic acid as neutralising agent the polymer obtained was stable up to 150° C.

EXAMPLE 13

Phosphazene base ring-opening polymerisation using [(Me₂N)₃P=N—)₄P][F] catalyst D4 cyclics (1 Kg) was placed in a reaction vessel under nitrogen, stirred and heated to 100° C. and stirred for 30 minutes to remove any CO₂ dissolved in the cyclics. The catalyst [(Me₂N)₃P=N—)₄P][F](12 ppm) was added as a 0.3 molar benzene solution. Polymerisation occurred within 2 minutes of adding the catalyst and the stirrer was turned off after 5 minutes. Heating was continued for 30 minutes at 100° C. followed by cooling the mixture to 25° C. The product was removed from the reaction vessel and stored in glass jars. The product was analysed by gpc (gel permeation chromatography) and found to have a molecular weight Mw of 800000.

The reaction was repeated at room temperature in air using 100 g of D4 cyclics with 227 ppm catalyst. The polymerisation is slow and took 2 h to show an increase in viscosity and 18 h to form a gum consistency product.

That which claimed is:

1. A process for the ring-opening polymerisation of cyclosiloxanes, comprising contacting a cyclosiloxane with 1–500 ppm by weight of a phosphazene base, based on the weight of cyclosiloxane, in the presence of water.

2. A process according to claim 1, in which water is present in an amount of at least 0.5 mols per mol of phosphazene base.

3. A process according to claim 1, in which water is present in an amount of 0.5–10 mols per mol of phosphazene base.

4. A process according to claim 1, in which the phosphazene base is present in an amount of from 2–200 ppm by weight, based on the weight of cyclosiloxane, and water is present in an amount of at least 1 mol per mol of phosphazene base.

5. A process according to claim 1, in which the phosphazene base is selected from the group consisting of.

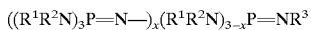

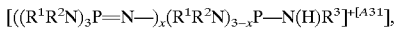

and

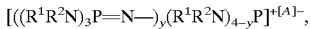

wherein each of $R^1$ and $R^2$ is independently selected from the group consisting of hydrogen, a hydrocarbon group and a substituted hydrocarbon group, or $R^1$ and $R^2$ together form a heterocyclic ring, and $R^3$ is selected from the group consisting of hydrogen, hydrocarbon and substituted hydrocarbon groups, x has a value 1, 2 or 3, y is 1, 2, 3 or 4 and A is an anion.

6. A process according to claim 1, in which the cyclosiloxane is of the general formula $(R_2SiO)_n$, wherein each R is independently selected from the group consisting of hydrogen, alkyl, alkenyl, aryl, alkaryl and aralkyl group having up to 8 carbon atoms, substituted alkyl, alkenyl, aryl, alkaryl and aralkyl group having up to 8 carbon atoms, where n denotes an integer with a value of from 3 to 12.

7. A process to claim 1, in which the cyclosiloxane is present together with an agent which inhibits catalyst activity of the phosphazene base, and in which the polymerisation is initiated by reducing the effect of the inhibiting agent.

8. A process according to claim 1, in which the cyclosiloxane is present in conditions which inhibit catalyst activity of the phosphazene base, and in which the polymerisation is initiated by reducing the effect of the inhibiting conditions.

9. A process according to claim 7, in which the inhibiting agent is selected from the group consisting of carbon dioxide, excess water and a combination of carbon dioxide and excess water, and in which the polymerisation reaction is initiated by heating.

10. A process according to claim 1, in which an endblocker is present in an amount calculated to result in a desired molecular weight range of polymer.

11. A process according to claim 1, in which polymerisation is terminated by adding a neutralising agent which prevents further catalyst activity.

* * * * *